No. 852,883. PATENTED MAY 7, 1907.
F. S. KEYES.
TRANSMITTING MECHANISM.
APPLICATION FILED DEC. 6, 1905.

2 SHEETS—SHEET 1.

Witnesses:

Inventor
Frederick S. Keyes
By his Attorney,

No. 852,883. PATENTED MAY 7, 1907.
F. S. KEYES.
TRANSMITTING MECHANISM.
APPLICATION FILED DEC. 6, 1905.
2 SHEETS—SHEET 2.
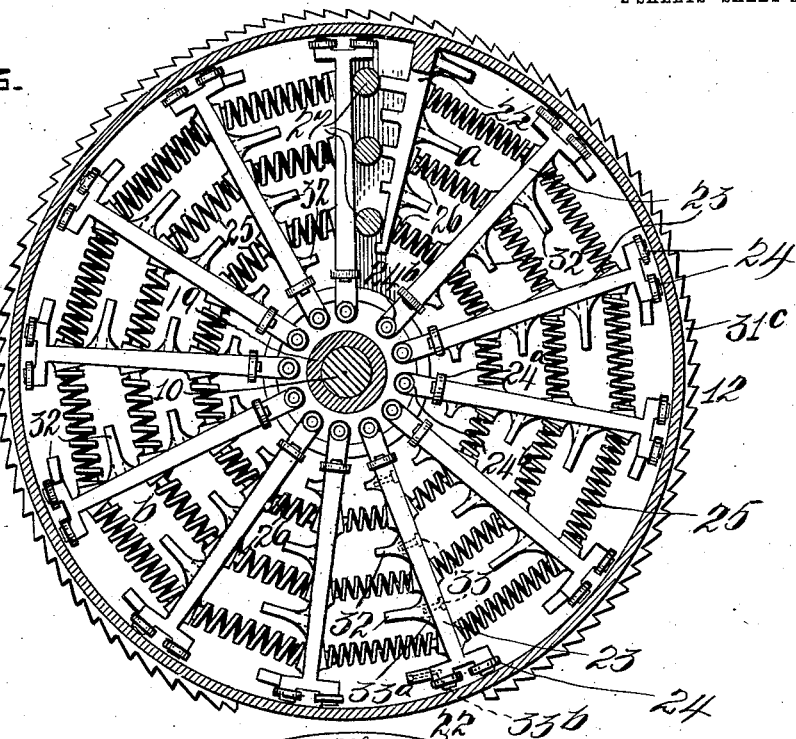
Witnesses:
Inventor
Frederick S. Keyes.
By his Attorney

UNITED STATES PATENT OFFICE.

FREDERICK S. KEYES, OF WARREN, MASSACHUSETTS.

TRANSMITTING MECHANISM.

No. 852,883.  Specification of Letters Patent.  Patented May 7, 1907.

Application filed December 6, 1905. Serial No. 290,626.

*To all whom it may concern:*

Be it known that I, FREDERICK S. KEYES, a citizen of the United States, residing in Warren, in the county of Worcester and State of Massachusetts, have invented certain new and useful Improvements in Transmitting Mechanisms, of which the following is a specification.

My invention relates to transmitting mechanism, and especially to those in which one or more series of yieldable members are interposed between a power-receiving element and an element to which variable power is applied to modify and control its effect. The fluctuations in such applications of power, on account of the inertia of the parts and from various causes inherent in the apparatus in connection with which the transmitting mechanism is employed, are liable to include a considerable number of comparatively feeble impulses, as well as those of greater magnitude, and others that are weak in their initial stages but which rapidly increase to a maximum. I have found that when the members of a transmitting mechanism offer uniform resistance throughout the series, they must be either too rigid to properly yield under the action of the lesser impulses, or too flexible to modify the greater in the manner desired. To obviate these difficulties and to provide means for limiting the range of action of the yieldable members, to prevent their injury, are the principal objects of my invention.

Figure 1:
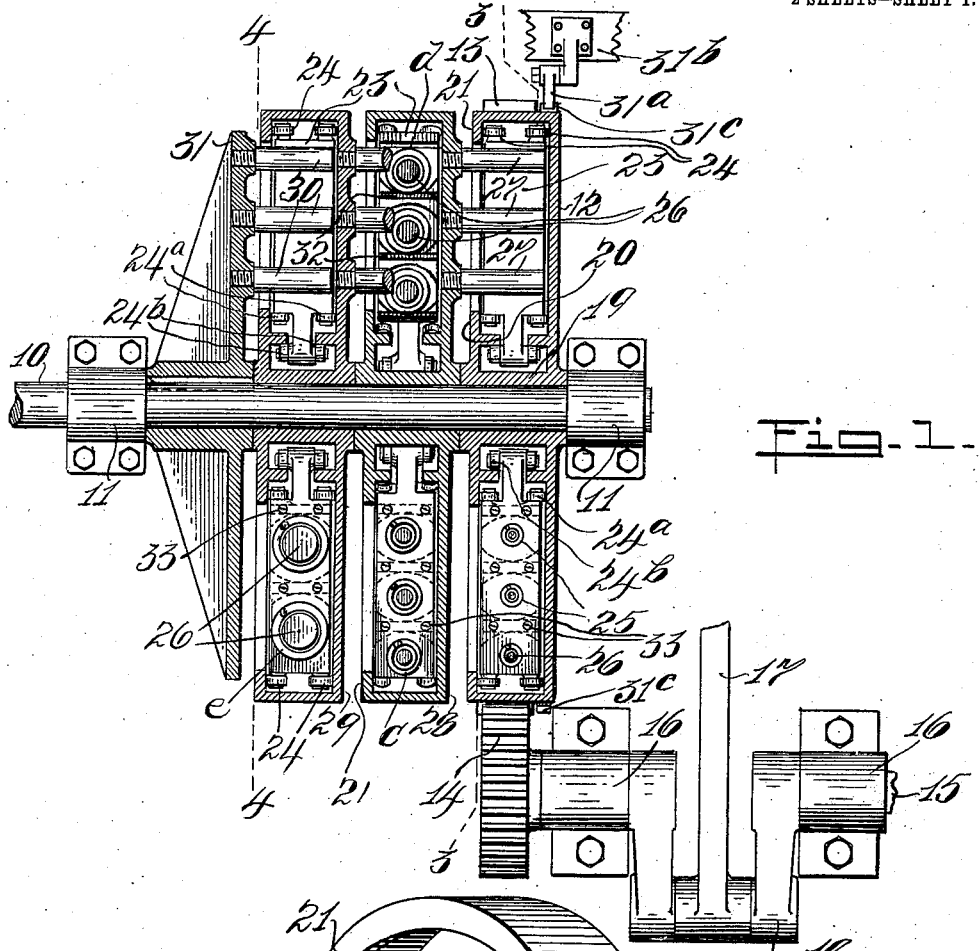
Figure 2:
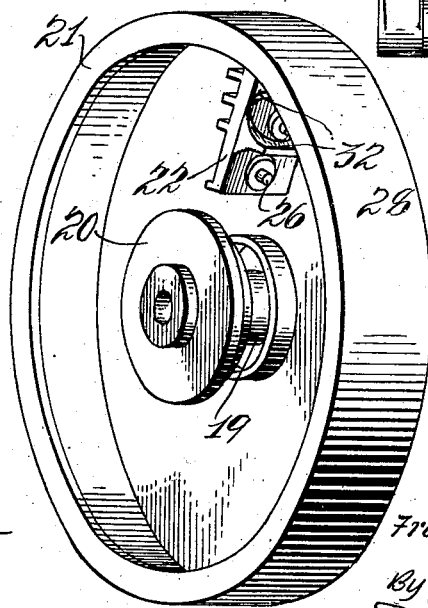

In the accompanying drawings, Figure 1 is a top plan view of one embodiment of the invention, parts being in section; Fig. 2 is a perspective view of one of the transmitting members, and Figs. 3 and 4 are the vertical sections on the lines 3—3 and 4—4, respectively, of Fig. 1.

Similar characters indicate like parts throughout the several figures of the drawings.

Upon a shaft 10 journaled in bearings 11 is rotatably mounted a transmitting member 12. This transmitting member is shown as in the form of a wheel or narrow drum to which power may be applied through teeth 13, encircling its periphery and with which meshes a pinion 14 fast upon a counter-shaft 15. The counter-shaft is journaled in bearings 16 and this is illustrated as driven by a connecting rod 17, a portion only of this element being shown, which is articulated to a crank 18 on the counter-shaft. Power is impressed upon the connecting rod from any source the action of which it is desired to cushion and modify. At the inner side of the drum is a hub 19 from which a flange 20 extends toward an opposite peripheral flange 21, there being a considerable opening between these two flanges.

Fixed within the drum upon the inner face of its head is a generally radial abutment 22, and about said drum, spaced from one another at convenient intervals, are radially-arranged movable abutments 23, of which there are any suitable number, 12 being shown here. The last-named abutments may be guided in their movement within the drum by sets of rolls 24, mounted upon their outer extremities and contacting with the head and the flange 21, and inner pairs or sets $24^a$ and $24^b$, the former being located similarly to the rolls 24, in co-operation with the flange 20, while those numbered $24^b$ are in contact with the inner surface of a chamber formed in the hub.

The abutments serve as connecting members between sections of yieldable members, preferably provided by series of circularly-arranged and concentric spiral springs 25, which may be retained upon the abutments against lateral displacement by bosses 26 which their ends surround. Each radial series of the springs between any two abutments preferably all offer the same resistance to movement, but the circumferential series are graduated, there being shown in connection with the wheel 12 two sets $a$ and $b$, the first being nearer the abutment 22 or to the point of application of power. This series presents the least resistance, an effect which may be secured by making the springs of lighter material and, incidentally, of less diameter.

With the last of the movable abutments, or that adjacent to the fixed abutment, contacts a series of studs or projections 27, here shown as three in number corresponding to the radial series of springs. They extend from one side of a wheel or intermediate transmitting member 28, which at the opposite side may be in all respects similar to that just described. As illustrated, there are two of these wheels, that designated as 28 and a second, 29, rotatable upon the shaft 10 similarly to the wheel 12. Carried by each of the members 28 and 29 are groups of springs arranged similarly to the springs 25, those of the wheel 28 are divided into sets $c$ and $d$ and those of the wheel 29 into sets $e$ and $f$. The relation of the entire series, including all the groups, is such that there is a gradual progressive increase from $a$ to $f$ in the resistance offered. To secure the requisite strength of spring in the set $f$, they are shown as of such weight of material and diameter that there are but two concentric series occupying the space of three series of the other sets. Obviously, however, this method of obtaining the correct relation is not essential and any convenient number may be employed, this being also true of the numbers of groups and sets.

With the last abutment of the series $f$ contacts projections 30 from a wheel 31, keyed upon the shaft 10 and constituting therewith an element receiving power through the yieldable system. It may be considered also as a member of the transmitting mechanism.

When power is transmitted through such a system, the excessive impulses or resistances of the applying or receiving elements are absorbed and the effect averaged or equalized. For minor fluctuations, only the first set, $a$, of springs may be affected, but as these increase or as other greater impulses are impressed upon the power-applying element, the other sets successively yield, until under a maximum stress the last set is compressed. Thus it will be seen that for any predetermined range the least fluctuation will be taken up with the same certainty as the greatest.

Mechanism may also be provided for controlling the direction of expansion of the springs, to prevent their reaction upon the power-applying element. This, as illustrated, consists of one or more pawls $31^a$ mounted upon some relatively-fixed member $31^b$ and coöperating with ratchet-teeth $31^c$ conveniently formed upon the periphery of the wheel 12. In this manner, whatever force is impressed upon the springs will be stored until it becomes available to operate the power-receiving element.

If the springs of the system were placed under such compression that their convolutions contact with one another, any increase would tend to crush them or to cause buckling, either of which might prove destructive. This is particularly liable to occur in the herein-described mechanism in which the maximum stresses are transmitted through the least resistive springs. To prevent injury to the springs I preferably furnish means for limiting the movement of each abutment toward that beyond it to an amount less than the yieldability of the springs. This means, as here illustrated, consists of stop members 32 projecting from the abutments 22 and 23 toward the companion abutments in the direction which they move, and being recessed at their opposite sides to give ample room for the springs, without material sacrifice of strength. The length of these stop members is such that before the springs are fully compressed they come into contact with the next abutment to prevent further relative movement, although allowing said abutments to travel together to transmit movement to succeeding members. Though these stop projections may be formed integrally upon the abutments, I prefer to secure them in place by means of screws 33 extending through enlarged base portions $33^a$, or, in the case of the outer projections, by screws $33^b$, countersunk in the outer faces of the projections. This not only provides means for conveniently replacing them in case of breakage, but also allows projections of different lengths to be applied, to proportion their lengths for springs of different resistances. Thus the same mechanism may be readily adapted to the transmission of forces of different magnitudes and characters. The location of the projections with regard to the springs and the extent of their contact ends is such that the checking effect between adjacent abutments is complete, so there will be neither longitudinal or lateral tilting, which might occur if a single projection were used or if its contact face were much narrower than the co-operating abutment. A convenient manner of arrangement is to place a stop projection upon each side of each of the springs. When so disposed, if one of the springs is unduly weak or becomes broken, the projections associated with it takes the strain and prevents distortion or stresses at an excessive angle upon the other springs. To guard against the contact of the rolls $24^b$, they may be made of less diameter than the thickness of the abutments, so that the latter will contact with one another, limiting the movement at this point in the same manner as the projections.

Having thus described my invention, I claim:

1. The combination with a power-applying and a power-receiving element, of an interposed series of yieldable members arranged in independently movable groups, each of said groups offering a resistance different from the companion groups.

2. The combination with a power-applying and a power-receiving element, of an interposed series of yieldable members arranged in independently movable groups, the members of each group offering different resistances.

3. The combination with a power-applying and a power-receiving element, of an interposed series of yieldable members arranged in independently movable groups, each of said groups offering a resistance different from the companion groups and the members in each group offering different resistances.

4. Mechanism comprising a plurality of transmitting members, a plurality of movable connecting members associated with each transmitting member, and yieldable members situated between the connecting members, said yieldable members in the different transmitting members offering different resistances.

5. Mechanism comprising a plurality of transmitting members, a plurality of movable connecting members associated with each transmitting member, and yieldable members situated between the connecting members, said yieldable members in the different transmitting members offering resistances gradually increasing from transmitting member to transmitting member.

6. Mechanism comprising a plurality of transmitting members, a plurality of movable connecting members associated with each transmitting member, and yieldable members situated between the connecting members, said yieldable members in the different transmitting members offering resistances gradually increasing from transmitting member to transmitting member and also varying in each of the members.

7. Mechanism comprising co-operating transmitting members, intermediate movable connecting members, yieldable members between the connecting members, and means carried by the connecting members for limiting their movement to less than the yieldability of the intermediate members.

8. Transmitting mechanism comprising a rotatable member having abutments, one of which is movable, a spring situated between the abutments, and a stop projecting from one of the abutments toward another.

9. Transmitting mechanism comprising a rotatable member having abutments, one of which is movable, a plurality of springs situated between the abutments, and a plurality of projections carried by one of the abutments and extending between the springs toward the adjacent abutment.

10. Mechanism comprising co-operating transmitting members, intermediate movable abutments, yieldable members between the abutments, and separable stop-projections carried by the abutments.

11. Mechanism comprising co-operating transmitting members, intermediate movable connecting members, yieldable members between the connecting members, and stops projecting from the connecting members at each side of the yieldable members.

12. Transmitting mechanism comprising a rotatable member having abutments, one of which is movable, a spring situated between the abutments, and a stop projecting from one of the abutments toward another and being adapted to contact therewith over a considerable portion of its width.

Signed at Warren, in the county of Worcester, and State of Massachusetts, this 29th day of November, 1905.

FREDERICK S. KEYES.

Witnesses:
JOSEPH ST. GEORGE,
JOSHUA F. BOSTOCK.